Patented Aug. 20, 1940

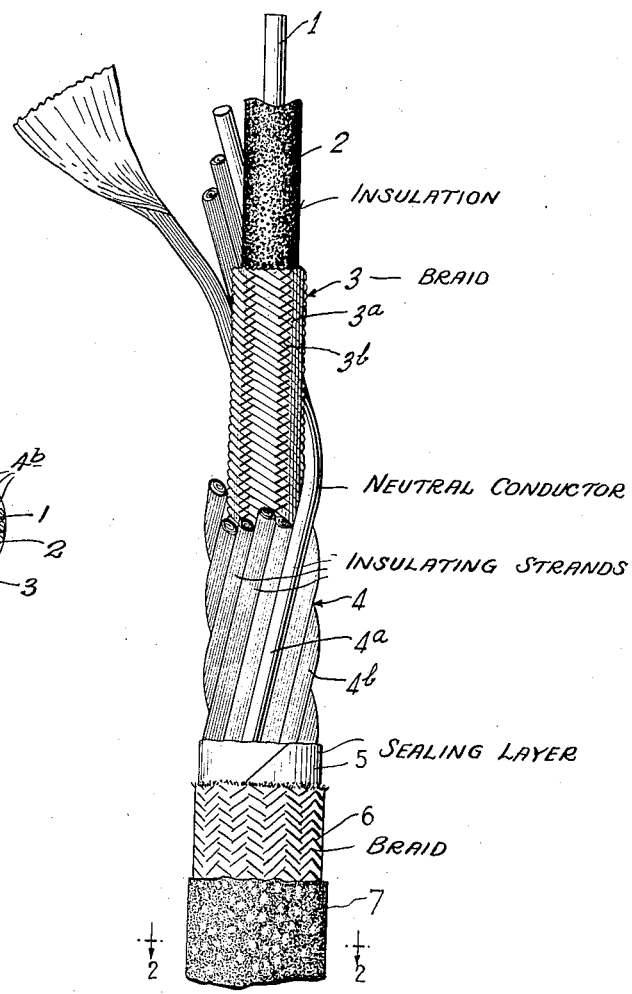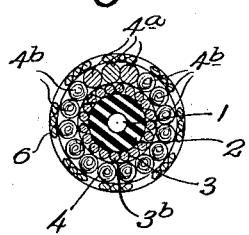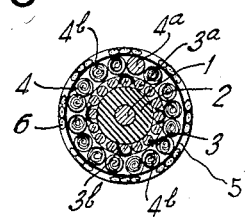

2,212,360

UNITED STATES PATENT OFFICE 2,212,360

ELECTRICAL CABLE

James Nelson Aken, Rome, N. Y., assignor to General Cable Corporation, New York, N. Y., a corporation of New Jersey Application July 10, 1936, Serial No. 89,909

4 Claims. (Cl. 174—116)

This invention relates to electrical cables and has for an object the provision of improvements in this art.

More particularly the invention relates to electrical cables intended primarily for the wiring of buildings which comprise one or more insulated conductors and a bare conductor, all of which conductors are adapted to be connected in an electrical circuit and to carry electrical current. The bare conductor, composed of one or a plurality of metal strands or wires, may be referred to as the bare neutral, and is separated from the insulated conductor or conductors by a layer or sheath of tough flexible fibrous non-metallic material. The bare neutral conductor, comprising one or a plurality of metal strands or wires, is wrapped, together with strands of non-metallic insulating material such as twisted paper, spirally around the insulated conductor or conductors over the sheath, and the whole assembly is surrounded by an outer protective jacket, such as an impregnated or coated fabric braid. The placing of the bare neutral in the layer of insulating strands causes the bare neutral to be held securely in place, produces a smooth cylindrical outer surface and strengthens the cable as a whole. A somewhat similar conductor without the insulating strands for the bare neutral conductor is disclosed and claimed in my companion application Serial No. 89,908, filed of even date herewith, which has become Patent No. 2,181,094 dated November 21, 1939.

Among the more specific objects of the invention are the provision of a non-metallic sheathed cable which will present a straight smooth exterior appearance; which will have good flexibility and which will not lose its shape when flexed; which will have good electrical insulating characteristics as between the separate conductors thereof and adequate insulating and protective characteristics as between the conductors and external objects with which the cable may contact; which will have pronounced longitudinal strength to enable it to withstand pulling strains; which will have great resistance to mechanical penetration to the insulated conductor or conductors; which may be readily stripped at the ends for making connections; but without raveling beyond the desired point of strippage; which may be relatively easily and inexpensively manufactured; and which will have other desirable characteristics which will be apparent from the following description of a specific embodiment of the invention considered with reference to the accompanying drawing thereof, wherein:

Fig. 1 is a longitudinal side view of one form of construction embodying the invention in a two-conductor cable, the outer elements being progressively removed to show the interior construction;

Fig. 2 is a section taken on the line 2—2 of Fig. 1; and

Fig. 3 is a similar sectional view showing a stranded bare vertical conductor.

Referring to the drawing, the cable illustrated comprises a conductor 1 covered with rubber or other suitable insulating material 2. The insulated conductor is encased in a protective sheath 3, preferably of tough, dense, fibrous, non-metallic material. This sheath 3 is laid up in such a manner as to substantially completely cover the insulated conductor, but at the same time so as to be relatively flexible. One suitable form of sheath may be constructed by tightly braiding relatively coarse stiff strands $3a$, such as twisted paper, cotton or other fibrous material, with relatively light flexible strands $3b$ of a binding material such as cotton threads. The heavy strands $3a$ can thus be laid in substantially edge-to-edge contact, the smaller strands $3b$ bending in and out around the heavy strands and embedding themselves slightly therein without substantially separating the heavy strands. The light strands do not form a continuous layer, but are sufficiently numerous to bind the heavy strands in place. The light strands may be dyed to impart a color character to the conductor to permit it to be readily identified.

In the drawing only one insulated conductor has been illustrated but a plurality may be used, in which case the insulated and sheathed conductors are laid parallel or cabled together.

Over the insulated conductor or conductors which are each provided with a protective sheath 3 there is laid, preferably in long turns, a layer 4, comprising one or more bare conductors $4a$ and one or more non-metallic strands $4b$ of tough, stiff, fibrous material such as twisted paper, cotton or other suitable material. For an inexpensive structure paper is preferred. The metallic and non-metallic strands are of approximately the same size and together are sufficiently numerous to form a substantially continuous smooth layer. If there is a single insulated conductor the metallic strand or strands $4a$ will have a total cross sectional area approximately equal to that of the insulated conductor, and if there are a plurality of insulated conductors the area of the bare neutral either may be equal to that of one of the insulated conductors, or may be somewhat less than that of either insulated conductor in accordance with the usual practice.

When a plurality of bare conductor strands 4a are employed they are preferably grouped together, that is adjacent to each other in the layer 4, so they may be readily picked out and connected when the cable is installed.

Over the entire assembly there are placed such enclosing protective layers as may be required for the purposes which the cable is intended. In the illustrated embodiment a fibrous wrapping 5 and a jacket 6 of braided fibrous material are employed. The wrapping 5 may be either a spiral or longitudinal overlapping wrapping, for example paper or rubberized fabric tape. This wrapping serves to bind the layer 4 in place and to act as a seal resistant to inward penetration of the compound with which the jacket 6 is treated, thereby keeping the layer 4 clean and non-sticky. The braid 6, for example cotton, may be impregnated and/or coated with a flame and moisture resisting compound 7 such as stearin pitch. The outer surface of the stearin pitch coating may be sealed and made non-sticky by an overlying coating, for example size and mica, and if desired the outer surface of this non-sticky coating may be painted or further coated with colored lacquer or any suitable material.

While one embodiment of the invention has been described for purposes of illustration it is to be understood that the invention may have various embodiments within the limits of the prior art and the scope of the subjoined claims.

I claim:

1. An electrical cable for use in wiring of buildings, comprising in combination, an insulated conductor, a flexible non-conductive protective sheath enclosing said insulated conductor formed of a plurality of closely placed relatively heavy spiral strands of tough dense fibrous material braided with a plurality of relatively light spiral strands of flexible fibrous material, a continuous layer of substantially uniform thickness surrounding said protective sheath and comprising a bare neutral stranded conductor of ribbon-like form spirally wrapped with a long lay directly over said sheath and adjacent non-metallic strands all disposed side by side in ribbon-like form and supplementing said bare neutral conductor throughout said layer, a flexible sealing layer of fibrous material over said continuous layer, and an outer flame and moisture resistant fabric braid.

2. An electrical cable for use in wiring of buildings, comprising in combination, an insulated conductor, a flexible non-conductive protective sheath enclosing said insulated conductor formed of a plurality of closely placed relatively heavy spiral strands of tough dense fibrous material braided with a plurality of relatively light spiral strands of flexible fibrous material, a continuous layer of substantially uniform thickness surrounding said protective sheath and comprising a bare neutral stranded conductor of ribbon-like form spirally wrapped with a long lay directly over said sheath and adjacent non-metallic strands of tough twisted fibrous material all disposed side by side in ribbon-like form and supplementing said bare neutral conductor throughout said layer, a flexible sealing layer of fibrous material over said continuous layer, and an outer flame and moisture resistant fabric braid.

3. An electrical cable for use in wiring of buildings, comprising in combination, an insulated conductor, a flexible non-conductive protective sheath enclosing said insulated conductor formed of a plurality of closely placed relatively heavy spiral strands of tough dense fibrous material braided with a plurality of relatively light spiral strands of flexible fibrous material, a continuous layer of substantially uniform thickness surrounding said protective sheath and comprising a bare neutral stranded conductor of ribbon-like form spirally wrapped with a long lay directly over said sheath and adjacent non-metallic strands of tough twisted fibrous material of substantially the same thicknesses as the bare neutral conductor all disposed side by side in ribbon-like form and supplementing said bare neutral conductor throughout said layer, a flexible sealing layer of fibrous material over said continuous layer, and an outer flame and moisture resistant fabric braid.

4. An electrical cable for use in wiring of buildings, comprising in combination, an insulated conductor, a flexible non-conductive protective braided sheath united to and enclosing said insulated conductor and comprised of relatively heavy fibrous strands, a continuous layer of substantially uniform thickness surrounding said protective sheath and comprising a bare neutral stranded conductor of ribbon-like form spirally wrapped with a long lay directly over said sheath and adjacent non-metallic strands of tough twisted fibrous material of substantially the same thickness as the bare neutral conductor all disposed side by side in ribbon-like form and supplementing said bare neutral conductor throughout said layer, a flexible sealing layer of fibrous material over said continuous layer, and an outer flame and moisture resistant fabric braid.

JAMES NELSON AKEN.